Figure 1:
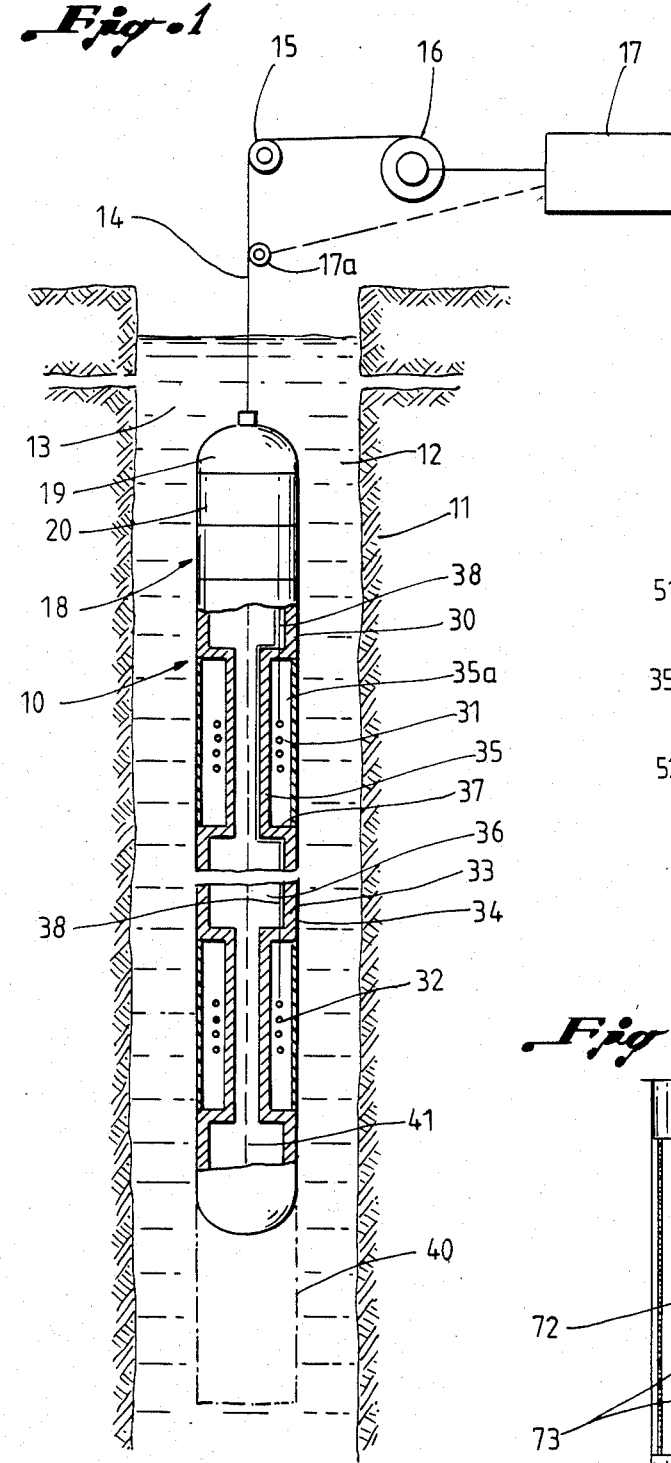

United States Patent [19]

Barber et al.

[11] Patent Number: 4,651,101
[45] Date of Patent: Mar. 17, 1987

[54] INDUCTION LOGGING SONDE WITH METALLIC SUPPORT

[75] Inventors: Thomas D. Barber; Richard N. Chandler, both of Houston; John F. Hunka, Kingwood, all of Tex.

[73] Assignee: Schlumberger Technology Corporation, Houston, Tex.

[21] Appl. No.: 718,003

[22] Filed: Apr. 3, 1985

Related U.S. Application Data

[63] Continuation-in-part of Ser. No. 584,059, Feb. 27, 1984, abandoned.

[51] Int. Cl.⁴ ............................................. G01V 3/28
[52] U.S. Cl. .................................................... 324/339
[58] Field of Search ................................ 324/338–343, 324/356, 369; 336/198, 208; 324/219–221

[56] References Cited

U.S. PATENT DOCUMENTS

| | | | |
|---|---|---|---|
| 2,967,994 | 1/1961 | Peterson | 324/221 |
| 3,214,686 | 10/1965 | Elliot et al. | 324/339 |
| 3,249,858 | 5/1966 | Gouilloud | 324/339 |
| 3,305,771 | 2/1967 | Arps | 324/342 |
| 3,408,561 | 10/1968 | Redwine et al. | 324/342 |
| 3,417,325 | 12/1968 | McCullough et al. | 324/221 |
| 3,534,256 | 10/1970 | Johnson | 324/340 X |
| 4,511,843 | 4/1985 | Thoraval | 324/338 |
| 4,536,714 | 8/1985 | Clark | 324/338 |
| 4,553,097 | 11/1985 | Clark | 324/338 |
| 4,603,297 | 7/1986 | Safinya | 324/338 |

OTHER PUBLICATIONS

Rodney et al, "The Electromagnetic Wave Resistivity Tool", SPE publication 12167, Oct. 1983, pp. 1–11.

Primary Examiner—Gerard R. Strecker
Attorney, Agent, or Firm—Henry N. Garrana; Michael D. Rostoker

[57] ABSTRACT

Induction logging sonde including transmitter and receiver solenoid coils mounted on a support and axially separated from each other. The support is made of conductive material and comprises at least one first longitudinal portion for mounting the coils and second longitudinal portions on each side of the first portion. At least the first portion has a substantially continuous and axi-symmetric outer surface so as to favor the flow of eddy currents around the surface, whereby the electric field on that surface is substantially cancelled.

16 Claims, 6 Drawing Figures

U.S. Patent  Mar. 17, 1987  Sheet 1 of 3  4,651,101

INDUCTION LOGGING SONDE WITH METALLIC SUPPORT

This is a continution-in-part of application Ser. No. 584,059 filed Feb. 27, 1984, abandoned.

The present invention relates to well logging apparatus for investigating the properties of subsurface formations traversed by a borehole and more particularly to an induction logging sonde.

An induction logging apparatus basically comprises a transmitting coil and a receiving coil mounted on a support and axially spaced from each other in the direction of the borehole. The transmitting coil is energized by an alternating current at a frequency which is typically 20 kHz and generates a magnetic field which induces in the surrounding formation eddy currents which flow coaxially to the borehole and the intensity of which is proportional to the conductivity of the formation. The field generated in turn by these currents induces in the receiving coil an electromotive force. By suitably processing the signal from the receiving coil, a measurement of the conductivity of the formation is obtained.

In the conventional induction logging sondes, the support of the coils is in the form of a tubular mandrel of non-conductive material such as fiberglass reinforced epoxy resin (see for instance U.S. Pat. Nos. 3,179,879 to Tanguy, 3,147,429 to Moran, and 3,706,025 to Regat). It has always been the belief that because of the very low level of the signal from the receiving coil, it is critical to minimize any presence of conductive material in the vicinity of the coils, in order to avoid spurious currents flowing near the coils and creating a spurious component ("sonde error") see for instance the publication S.P.E. 12 167 (Society of Petroleum Engineers) "The Electromagnetic Wave Resistivity MWD Tool" by P. F. Rodney et al, presented at the 58th Annual Technical Conference and Exhibition, San Francisco, Oct. 5-8, 1983, page 1, left column, second paragraph. An obvious drawback of using supports of synthetic resin is that they are very fragile in use, and among the different types of logging apparatus, the induction sondes are considered to be most fragile. Moreover, since measurement-while-drilling devices have to be built around a collar of steel (or other high strength material) inside of which the drilling mud can be circulated, it has been considered that induction tools cannot be used in the measurement-while-drilling context, as pointed out in the above-mentioned S.P.E. publication.

It should be pointed out that totally excluding metallic parts near the coils is impossible because electrical leads are necessary to energize the transmitting coil and convey the signal from the receiving coil. In conventional induction sondes, the leads are in the form of rigid, pressure-resistant multilayer coaxial cables. These cables have coaxial metal "layers" insulated from each other, with the inner layers acting as conductors conveying signals while the outer layers provide the mechanical strength and a shielding for the conductors. These cables and the discontinuities at the connection with the coils give rise in the presence of the transmitting field to eddy currents which produce an error in the output signals. In the case of low conductivity formations, this error can be of the same order as the useful signal. Additionally, this error is highly subject to temperature drift and its value at room temperature is substantially different from its value in the borehole environment where the temperature may be above 150° C. The error may further vary with the age of the equipment, for instance because of the aging of the synthetic resin and the bending that may affect the support.

It was proposed in U.S. Pat. No. 3,249,858 (Gouilloud) to use a support of metal for the purpose of increasing the mechanical strength. This patent teaches that in order to minimize the generation of spurious currents in the metallic support, the latter should comprise a diametrical through-slot extending over substantially its entire length. The patent also indicates that the coils should be made of circular turns connected to each other by linear conductive segments the midpoints of which are located in the diametrical plane of the slot. It is to be noted, however, that the improvement of the mechanical strength is limited by the slot traversing the support and also that the problems that arise from the presence of the electrical leads are not addressed.

One object of the present invention is to provide an induction logging sonde having an excellent mechanical strength and ruggedness.

Another object of the invention is to provide an induction logging sonde which presents a low, stable and predictable sonde error.

Another object of the invention as to provide an induction logging sonde in which the use of multilayer coaxial cables for the connections to and from the coils is avoided.

Another object of the invention is to provide an induction logging sonde which can be inserted in a combination of logging tools at any position within the combination.

Another object of the invention is to provide an induction logging sonde suitable for measurement-while-drilling applications.

There is provided in accordance with the invention an induction logging sonde comprising an elongate support of electrically conductive metal, generally cylindrical in shape, at least one transmitting solenoid coil and at least one receiving solenoid coil in coaxial and spaced relationship to the support. The transmitting coil operates at such a frequency that it produces an electromagnetic field substantially free of dielectric effects, a suitable frequency range being between about 10 and 400 kHz, a preferred lower limit of the frequency range being about 20 kHz and a preferred upper range being about 200 kHz. The support, at least in its portions adjacent the coils, has a substantially continuous, preferably axisymmetrical outer surface to favor the flow of eddy currents circularly around said surface.

Preferably the support includes an outer sleeve made of a metal having a high electrical conductivity, such as copper, and an inner core of a material of smaller conductivity but of higher strength, such as stainless steel.

The invention can be readily understood upon reading the following description with reference to the accompanying drawings.

Figure 2:
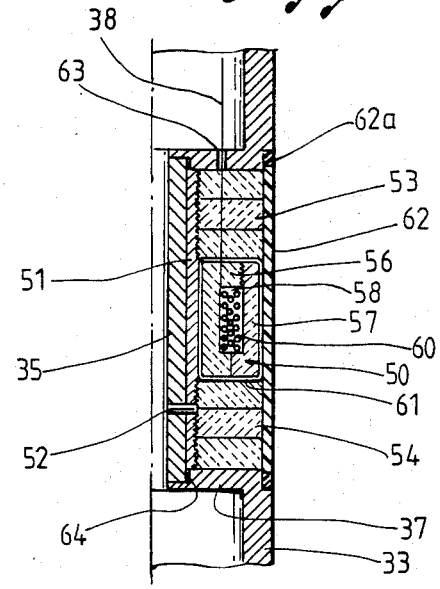
Figure 3:
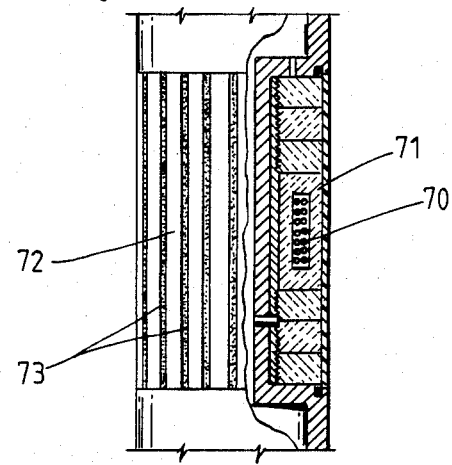
Figure 4:
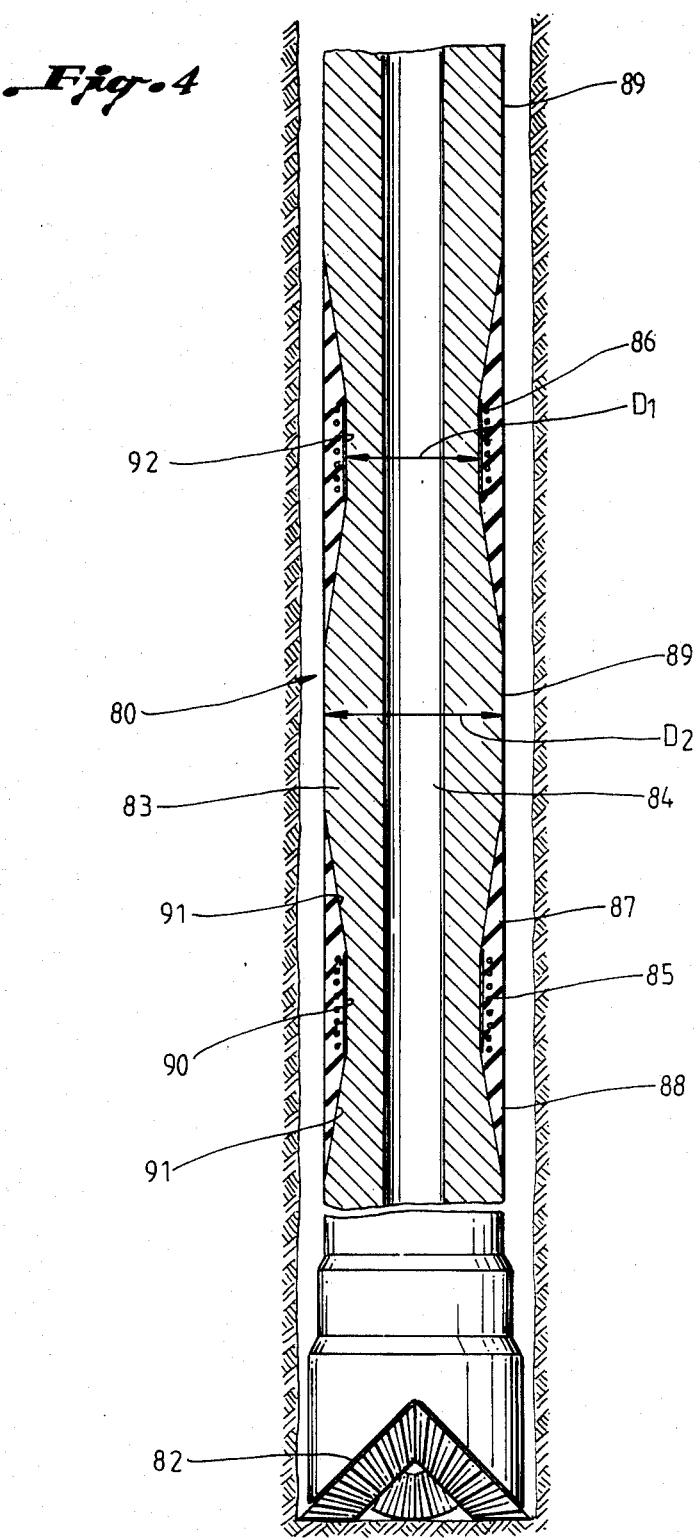
Figures 5, 6:
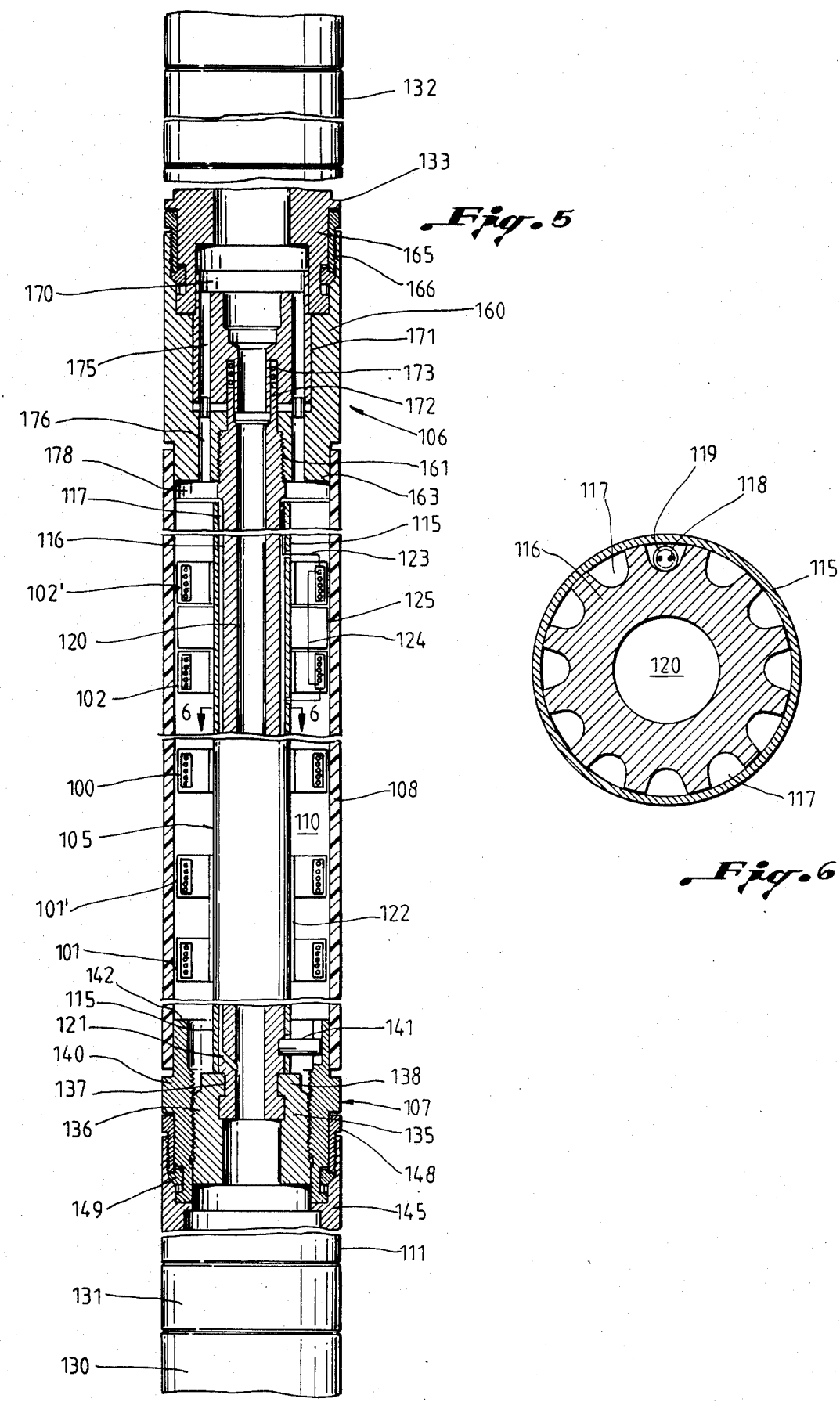

FIG. 1 shows schematically an embodiment of an induction logging sonde in accordance with the invention and the surface equipment connected to it, FIG. 2 is an enlarged detail view of a coil unit of the apparatus of FIG. 1, in a first embodiment, FIG. 3 illustrates a modified embodiment of the coil unit, FIG. 4 shows an induction logging sonde according to the invention adapted to measurement-while-drilling operation, FIG. 5 is a partly sectional longitudinal view of a preferred embodiment of the induction logging sonde, and FIG. 6 is a section according to line 6—6 of FIG. 5.

FIG. 1 shows an induction logging sonde 10 for investigating the geological formations 11 tranversed by a borehole 12. The borehole is filled with drilling mud 13. The apparatus is suspended from a multiconductor cable 14 which passes on a sheave 15 and is wound on a winch 16 which is part of the surface equipment associated with the downhole logging sonde. The surface equipment supplies the downhole apparatus 10 via the cable 14 with electrical power and signals for controlling its operation and receives from the downhole apparatus 10 measurement signals. The surface equipment includes means 17 for processing and recording these signals. A sensor 17a for detecting the motion of the cable is provided. The signals from the sensor 17a are indicative of the instantaneous depth of the downhole apparatus and are fed to the processing means for depth matching the measurement signals.

The downhole apparatus 10 comprises an electronic cartridge 18 connected to the cable 14 through the cable head 19. The cartridge 18 includes a telemetry cartridge 20 which converts the signals from the surface equipment produced by the downhole apparatus to a format suitable for transmission by the cable.

The downhole apparatus 10 also comprises an elongate support 30 the upper end of which is secured to the cartridge 18. The support 30 mounts a coil system which comprises a transmitting coil 31 and a receiving coil 32 coaxial to and spaced from each other in the longitudinal direction of the support 30. The transmitting coil 31 is energized to produce a magnetic field which induces in the formation eddy currents which flow coaxially of the axis of the support. The receiving coil generates in response to the field created by these currents an output signal representative of the conductivity of the formation. The frequency of operation of the transmitting coil is such that the field setup in the formations can be classified as a "quasi-static" electromagnetic field. In other words, the operating frequency is such that the displacement currents are negligible, conduction currents being predominant. The frequency suitably lies between about 10 and about 400 kHz. Above 400 kHz, displacement currents become significant and the output signal would be responsive not only to the conductivity of the formation but also to its dielectric constant, which would be undesirable for the purposes of the present invention. A preferred upper limit of the frequency range is about 200 kHz. A preferred lower limit of the frequency range is about 20 kHz.

In the schematic drawing of FIG. 1, the sonde is shown to have only a transmitting coil and a receiving coil, but it will be clear that each coil system can comprise more than two coils, for instance one or more transmitters, several receiver coils, and bucking coils respectively associated with the receiver coils to cancel out the effect of direct coupling between the transmitter coil and the receiver coils. The sonde could further comprise several coil systems distributed over its length.

The support 30 has a generally tubular shape and is made of a metal, preferably a non-magnetic metal having an excellent electrical conductivity. Suitable materials include copper and copper alloys, and stainless steel.

The support comprises cylindrical longitudinal portions 33 the outer walls 34 of which are in contact with the outside i.e. with the drilling mud, and cylindrical longitudinal portions 35 having an outside diameter smaller than portions 33. The portions 35 thus define recesses 35a for receiving the coils 31 and 32 which are coaxial to, and electrically insulated from, the respective portions 35. The embodiment shown in FIG. 1 includes such a recess for each coil, but it will be understood that one portion 35 can as well mount an entire coil system, i.e. one recess 35a can receive a plurality of axially spaced coils. The intermediate portions 33 have preferably an inside diameter larger than portions 35 and define inner spaces 36, and in the embodiment shown in FIG. 1, the portions 33 and 35 are connected by transverse portions 37. The walls of portions 33 have a sufficient thickness to withstand by themselves the hydrostatic pressure of the borehole fluid.

Respective conductors 38 routed inside the support connect the coils 31 and 32 to the electronic cartridge 18.

Since the support in the portions adjacent the coils is made of a highly conductive material and has a continuous axisymmetric outer surface, it is almost equivalent to a perfect conductor. This favors the generation of eddy currents in the presence of the electromagnetic field produced by the transmitting coil, which currents flow around the surface of the support. As a result, the tangential electric field is forced to zero at the surface of the support and no electromagnetic field is generated in the closed space defined by the interior of the support. The support constitutes therefore a very efficient electromagnetic shield. For instance, with an operating frequency of 20 kHz and a conductivity of $5.8 \times 10^7$ S/m (copper), a thickness of 5 millimeters represents 10 skin depths. The spurious effect of direct couplings between the conductors and the coils is thus eliminated and it is possible to use simple conductor wires rather than the conventionally used multilayer coaxial cables.

Moreover, since the tangential electric field is substantially cancelled at the surface of the support, the sonde error brought about by the eddy currents flowing around the support is low. It has been found that the sonde error, with a perfectly axisymmetric metallic support, is a decreasing function of the electrical conductivity of the material of the support and of the frequency. The mathematical expression of this variation is $$E = k \cdot \sigma^{-\frac{1}{2}} \cdot f^{-3/2}$$

where E stands for the sonde error, $\sigma$ for the conductivity, f for the frequency, and k is a coefficient. Accordingly, the sonde error is minimized if a metal of high conductivity is used. A typical value for the sonde error of the support, measured in the air, is 2 millisiemens, which is of the same order as the output signal as obtained in the case of most high resistivity formations. Additionally, a very significant advantage of the invention is that this sonde error shows a very low temperature drift and is well predictable. It is thus easy to correct the output signal for the influence of the metal support, by subtracting the well-defined sonde error from the output signal.

The fact that the coils are mounted around metallic portions has the effect of reducing the cross-sectional area available for the magnetic fluxes transmitted by coil 31 and received by coil 32, the surface area being dependent of the spacing between the coils and the outer surface of the portions 35. This causes a reduction in the sensitivity of the measurement, but this reduction can easily be compensated for by a proper design of the coils i.e. the number of turns of the coils is increased with respect to the conventional arrangement with a non-conductive support.

It should be noted, that the axial spacing e between the ends of a coil and the adjacent walls of the transverse portions 37 is suitably kept beyond a predetermined value. The vertical response of the sonde, when measured along the outer surface of the sonde, shows sharp peaks opposite the coils, the average width of the peaks being equal to about one diameter of the respective coil. In order to avoid any substantial alteration of the sonde response, the spacing between the ends of the coils and the adjacent transverse portion is chosen equal to at least about one diameter of the respective coil. If a plurality of coils are received within one recess 35a, then the spacing between each transverse portion and the end of the coil located nearest this transverse portion should be at least equal to about one diameter of the coil in question. In other words, the cylindrical portion of the support which mounts an individual coil or an entire coil system must have an axial dimension which exceeds that of the coil (respectively of the coil system) on each side of the coil (respectively of the coil system) by at least about one diameter of the coil (respectively one diameter of the end coils of the coil system).

In view of the foregoing, a support with a perfectly axisymmetric and continuous outer surface in the portions adjacent the coils is the optimum, but designs which slightly depart from this optimum are within the scope of the invention, provided that the flow of eddy currents around the support is not substantially affected. For instance, a cross-section generally similar to, but different from a circular cross-section, e.g. polygons, could be used. Also, small holes provided through the support, e.g. for passing conductors to the coils, will not substantially alter the flow of eddy currents. On the other hand, longitudinal slots through the support would oppose the flow of eddy currents and be detrimental to the shielding effect of the support.

A further advantage of the metal support is that it provides the sonde with an improved mechanical strength and ruggedness, and the portions 33 of the support are pressure resistant by themselves.

The spaces 36 defined inside the portions 33 can be taken to advantage for accommodating some of the electrical circuits of the sonde. In this case, instead of grouping all the circuitry in the cartridge 18 as shown in FIG. 1, there would be a transmission block connected to the transmitting coil 31 and disposed in a space 36 adjacent this coil, and a reception block connected to the output of the receiving coil and likewise mounted in a space 36 adjacent the receiving coil.

It should also be noted that owing to the mechanical strength of the support 30 and the possibility of routing conductor wires inside the support, the above described induction sonde can be combined with one (or more) logging apparatus of different type (sonic, nuclear) attached to the lower end of the induction sonde. Such an apparatus is shown in dotted lines in FIG. 1 with reference numeral 40. The conductors connecting this apparatus to the telemetry cartridge 20 via the inside space of the support 30 are also shown in dotted lines with reference numeral 41. Thus the induction sonde of the invention can be inserted at any location within a combination of logging sondes, while the conventional induction sonde with a non-metallic support can only be placed at the bottom of the combination.

FIG. 2 shows in more detail a suitable embodiment of the coil 31 and 32. Each coil is in the form of a coil unit 50. The coil unit is insulated from the portion 35 of the support by an insulating sleeve 51 for instance of ceramic. The sleeve 51 is secured to the portion 35 by a means such as a pin 52. The sleeve 51 mounts several rings 53, and several rings 54, screwed to the respective ends of the tubular part 51 on both sides of the coil unit so as to hold the latter in position.

The coil unit comprises a coil form made of two generally annular support parts 56, 57 of insulating material, for instance ceramic, which together have a rectangular section and define an annular internal space 58. The space 58 receives the turns 60 of the coil, which turns are disposed coaxially of the axis of the support 30. A plurality of conductive wires 61 are wrapped around the support parts 56, 57 in toroidal arrangement. Each wire is cut to prevent it from forming a closed loop and all the wires are connected to a ground ring, not shown, and thus are at the same ground potential. The wires 61 form an electrostatic shield which prevents any electrostatic coupling of the respective coil with the other coil or coils or with the drilling fluid. This arrangement is disclosed in more detailed manner in copending application entitled "Shielded Solenoid Coil for Well-Logging" Ser. No. 551, 239, assigned to the assignee of the present application and which is incorporated herein by reference.

A fluid-tight sleeve 62 of non-conductive material e.g. of fiberglass-reinforced epoxy is mounted around the coil unit to protect the coil unit from contact with the mud, with pressure seals 62a at both ends. The rings 53, 54, support the sleeve 62 on its inner surface to allow it to withstand the pressure of the mud. Holes such as 63 are provided in portion 37 of the support for the passage of electrical conductors connected to the coil.

In the above-mentioned case of several coils mounted on the same portion 35, additional rings similar to rings 53 would be provided in the spaces between the coils to hold the latter in position and support the sleeve 62 closing the recess 35a between the coils.

Furthermore, FIG. 2 shows the portions 35 and 33 as distinct parts, with threads 64 at both ends of the portions 35 for attaching them to the transverse portions 37, and the support is assembled after the coil units have been mounted on the portions 35.

It should also be noted, regarding the material of the support, that the portions 33 and 35 can be made of different materials, for instance stainless steel for the portions 33 and copper or copper alloy for the portions 35.

A modified embodiment is shown in FIG. 3. The coil 70 is enclosed in a coil form 71 similar to that constituted by parts 56,57 of FIG. 2. The coil is electrostatically shielded by a slotted cylindrical member 72 made of a conductive material, with insulating material to fill the slots 73. Like in the above-described embodiment, the coil form is held in position by rings screwed to a tubular part, which rings also engage the inner wall of the slotted member to back it against the pressure of the borehole fluid.

A modification to the above embodiments would be to pressurize the interior of the recesses accommodating the coil units to the pressure of the borehole fluid. Fluid lines would be routed inside the support 30 to connect these recesses to a conventional pressure compensation device. In that case, fluid-tight electrical feedthroughs would be provided to make the electrical connections through the wall of the recesses.

FIG. 4 shows an induction sonde in accordance with the invention adapted for measurement-while-drilling operation.

The sonde 80 is located above the drill bit unit 82. The support for the coils is provided by a section of the drill collar 83, a tubular member of steel which is conventionally connected to the bottom end of the drill string so as to be mounted above the bit unit. The drilling mud is circulated during drilling operation through the central bore 84 of the drill collar. The drill collar has a large thickness in order to add a suitable weight on the bit for drilling purposes.

FIG. 4 shows only two coils, a transmitter coil 85 and a receiver coil 86, but it will be understood that a bucking coil, not shown, is associated with the receiver coil for the purpose explained above, and the sonde can comprise several coil arrays having different spacings from the transmitter coil. All those coils will be arranged in the same fashion as coils 85 and 86.

The drill collar section 83 has portions of reduced outer diameter, thus defining circular recesses 87 in which the coils are received, each coil being embedded in a sleeve 88 of rubber or similar material which fills the recess. The rubber filling is such that the outer surface of the sleeve 88 is substantially flush with the cylindrical outer surface of the portions 89 of the drill collar section 83 exposed to the borehole fluids. Each recess 87 has a central cylindrical portion 90 of outer diameter $D_1$ smaller than the outer diameter $D_2$ of portions 89, the respective coil being mounted around that central portion, and frusto-conical portions 91 joining the central portion 90 to the portions 89 of the drill collar. Suitably the axial dimension of the frusto-conical portions is equal to about one diameter of the respective coil.

Signals applied to the transmitter coil and received from the receiver coils are conveyed by conductors, not shown, which are preferably routed in longitudinal grooves formed on the outer surface of the drill collar and filled with a suitable insulating and protecting material. Those conductors are connected to an electronic cartridge, not shown, located inside the drill collar at the top of the induction sonde.

In a preferred embodiment, a layer 92 of copper or other highly conductive material is formed at least on the central portion 90 of each recess to provide a surface of high conductivity in the vicinity of the coils, the drill collar section 83 being otherwise of steel as noted above.

FIG. 5 shows in partly sectional view a preferred embodiment of the induction sonde according to the invention.

In the embodiment of FIG. 5, a transmitter coil unit is shown at 100 and a plurality of arrays of solenoid coils are provided, each coil array including a receiver coil and a bucking coil designed and positioned so as to cancel out the effect of the direct coupling of the transmitter coil to the respective receiver coil. Receiver coils with different spacings from the transmitter are shown at 101, 102, and the bucking coils respectively associated with the receiver coils are shown at 101', 102'. All the coils are mounted about a central support 105 having an outer cylindrical surface of circular cross-section as clear from the section of FIG. 6. End portions 106, 107 of enlarged diameter are secured to the support 105 at both ends thereof. A tubular sleeve 108 of fiberglass epoxy is mounted about the coils to prevent contact with the borehole fluids. The sleeve is held in position between the end portions 106, 107, the sleeve having the same outer diameter as the end portions 106, 107. The free spaces in the annulus 110 defined between the central support 105 and the sleeve 108 are filled with pressurized oil and to that effect, they are in communication with a pressure compensation device, shown at 111 adjacent the lower end portion 107. The compensation device 111, a conventional element of well logging sondes, acts to pressurize the oil present in the annulus 110 to a pressure slightly greater than the pressure of the borehole fluids, so that the differential pressure on the sleeve 108 is small.

The section of FIG. 6 shows a preferred embodiment of the central support 105. The support comprises two parts, an outer sleeve 115 preferably of a highly conductive metal such as copper or a copper alloy, and an inner core 116 preferably of a metal of higher strength such as stainless steel. The outer sleeve is mounted over the inner core with a loose fit to take into account the difference between copper and steel with regard to thermal expansion. The inner core 116 has a plurality of longitudinal grooves 117 formed in its outer periphery for routing conductors. As shown in FIG. 6, the grooves receive conductors 118 threaded inside a tubular shield 119. Although each groove can receive a pair of conductors inside a shield, only one shield with conductors inside has been shown in FIG. 6. The purpose of the shield 119 is to minimize interferences between the conductors located in adjacent grooves. The shield can suitably be made of ferromagnetic material such as mumetal. In addition to the grooves 117, the inner core has a central longitudinal bore 120 which is used to route a power line and possibly conductors connected to other logging apparatus suspended from the induction logging sonde of the present invention. The grooves 117 and the central bore 120 are in fluid communication with the annulus 110 through radial holes, not shown, and therefore are filled with oil at the same pressure as in the annulus 110. A suitable method for manufacturing the inner core is extrusion through a die of appropriate design.

The coils can be in the form of the same coil units as described with reference to FIG. 2. The receiver coil and the associated bucking coil can be mounted on the same insulating sleeve of ceramic, as shown for coils 101 and 101', the respective sleeve being shown at 122, or they can be mounted on separate insulating sleeves as shown for coils 102, 102'. Radial holes are formed through the outer sleeve 115 of the support for passing conductors 123 connected to the receiver and the bucking coils, while another conductor 124 connects the coils of each pair to each other.

Filler elements 125 e.g. of epoxy are provided in the annulus 110 between the coils, to reduce the amount of oil which is to be pressurized by the compensation device 111 and thereby the length of this device.

The electronic cartridge necessary for the operation of the transmitter is schematically shown at 130 adjacent the lower end of the sonde, with a pressure bulkhead 131 disposed between the compensation device 111 and the cartridge 130. The electronic cartridge 132 connected to the receiver coils is mounted adjacent the upper end of the sonde, with likewise a pressure bulkhead 133 between the cartridge 132 and the coil section of the sonde. FIG. 5 also shows an embodiment of the upper end and lower end portions of the coil section of the sonde. In the lower end portion, two half-rings 135, 136 are clamped over the end of the inner core, which has a peripheral groove 137 for engagement with an inner collar 138 of the half-rings. The half-rings abut the end of the copper sleeve and are secured to each other by bolts not shown, so that they form a sleeve rotatable about the end of the support core. A sleeve 140 is threaded over the half-rings and restrained against rotation with respect to the support core 116 by a key 141 engaging key slots formed in the support and the sleeve 140. The sleeve 140 has a portion 142 of reduced outer diameter over which the outer sleeve 108 fits. The housing 145 of the compensation device is connected to the sleeve 140 by a nut 148 positioned between the sleeve 140 and the end portion of the housing 145 and in threaded connection with the latter, the nut 148 being secured against axial displacement with respect to the sleeve 140 by a retainer 149. By turning the nut by means of a special wrench, the housing is displaced axially relative to the sleeve 140, hence to the support of the coils. In addition, the grooves 117 are connected at their ends to inclined passages 121 which open into the central bore 120.

The arrangement at the upper end of the coil section includes a sleeve 160 having threads 161 engaging threads formed on the core 116 of the support adjacent its end. The sleeve has a portion 163 of reduced outer diameter over which the outer sleeve 108 fits. The sleeve 160 is connected to the housing 165 of the pressure bulkhead 133 by a nut 166 similar to nut 148, in threaded engagement with the sleeve 160 and restrained against axial displacement with respect to the housing 165.

The pressure bulkhead itself, schematically shown at 170, is a conventional piece of equipment in well logging sondes and has axially oriented passages, not shown, receiving pressure-resistant feedthroughs to which conductors are connected on both sides. An intermediate tubular member 171 is provided between the bulkhead 170, on the one hand, and the sleeve 160 and the end 172 of the coil support, on the other hand. The end 172 of the support core 116 has a reduced outer diameter and is engaged within an annular recess of the intermediate tubular member 171. A helical compression spring 173 is mounted between the intermediate member 171 and the end of the support 172, to apply a resilient force to the bulkhead. Axially oriented passages 175, 176 are formed respectively in the intermediate member 171 and the sleeve 160 for the conductors connected to the coils. The passages 176 communicate with the respective grooves 117 of the support through a part 178 secured to the support and having a respective plurality of radial slots for passing conductors.

Other and further modifications will occur to those skilled in this art and are deemed to fall within the spirit and scope of the invention as defined in the appended claims.

We claim:

1. Induction logging sonde adapted for displacement in a fluidfilled borehole for investigating the formations traversed by the borehole, comprising:
    at least one transmitting solenoid coil transmitting at a frequency between about 10–400 KHz for generating an electromagnetic field substantially free from dielectric effects, which field induces currents in the formation,
    at least one receiving solenoid coil axially spaced from the transmitting coil for producing in response to the field induced by these currents a signal indicative of the conductivity of the formation,
    an elongate support having at least one first longitudinal portion mounting said coils in coaxial and spaced relationship thereto and second longitudinal portions on both sides of said first portion, said support being made of electrically conductive metal, at least said first portion having a substantially continuous outer surface to favor the flow of eddy currents resulting from said electromagnetic field circularly around said surface, the second portions being exposed to the pressure of the borehole fluid.

2. A sonde according to claim 1, wherein said second portions of the support have an outer diameter larger than that of said first portion.

3. A sonde according to claim 2, wherein the first and the second portions of the support are connected by transverse portions spaced from the end of the adjacent coil by a distance equal to at least the diameter of the coil.

4. A sonde according to claim 2, wherein the second portions of the support have an inner diameter larger than that of the first portions.

5. A sonde according to claim 1, wherein the support is made of copper or copper alloy.

6. Measurement-while-drilling sonde adapted for connection to a drill string, for providing signals indicative of the conductivity of formations traversed by a borehole being drilled, comprising
    at least one transmitting solenoid coil transmitting at a frequency between about 10–400 KHz for generating an electromagnetic field substantially free from dielectric effects, which field induces currents in the formation,
    at least one receiving solenoid coil axially spaced from the transmitting coil for producing in response to the field induced by these currents a signal indicative of the conductivity of the formation,
    a generally tubular elongate support of electrically conductive metal adapted for connection to a drill string, said support having portions mounting said coils in coaxial and spaced relationship thereto, said portions having a substantially continuous outer surface to favor the flow of eddy currents resulting from said electromagnetic field circularly around said surface.

7. A sonde according to claim 6, wherein said portions have a reduced outer diameter to define recesses in which the coils are received.

8. A sonde according to claim 7, wherein the coils are embedded in rubber-like material.

9. A sonde according to claim 7, wherein said portions have a surface layer of a metal having a higher conductivity than that of the support.

10. A sonde according to claim 9, wherein the support is made of stainless steel and said layer is made of copper.

11. Induction logging sonde adapted for displacement in a borehole for investigating the formations traversed by the borehole, comprising:
    at least one transmitting solenoid coil transmitting at a frequency between about 10–400 KHz for generating an electromagnetic field substantially free from dielectric effects, which field induces currents in the formation, at least one receiving solenoid coil axially spaced from the transmitting coil for producing in response to the field induced by these currents a signal indicative of the conductivity of the formation, an elongate support mounting said coils in coaxial and spaced relationship thereto, said support being made of electrically conductive material and having at least in the vicinity of the coils a substantially continuous and axisymmetrical outer surface to favor the flow of eddy currents resulting from said electromagnetic field around said surface.

12. The sonde of claim 11, wherein said substantially continuous and axisymmetrical outer surface extends beyond the end of the respective coil in the longitudinal direction by at least about one diameter of the coil on both sides of the coil.

13. A sonde according to claim 11, wherein the support comprises an outer sleeve of a first material of high conductivity and an inner core of a second material of higher mechanical resistance than said first material, the inner core having an outside diameter substantially equal to the inside diameter of the outer sleeve.

14. A sonde according to claim 13, wherein the outer sleeve is made of copper or copper alloy and the inner core is made of stainless steel.

15. A sonde according to claim 13, wherein the inner core has longitudinal grooves formed in its periphery, said grooves defining with the inner surface of the outer sleeve respective passages, whereby conductors can be routed through the support.

16. A sonde according to claim 15, wherein the inner core further defines a central longitudinal bore.

* * * * *